June 8, 1926.
H. L. BLOOD
CONTROL SYSTEM
Filed Oct. 2, 1922
1,588,004
2 Sheets-Sheet 1
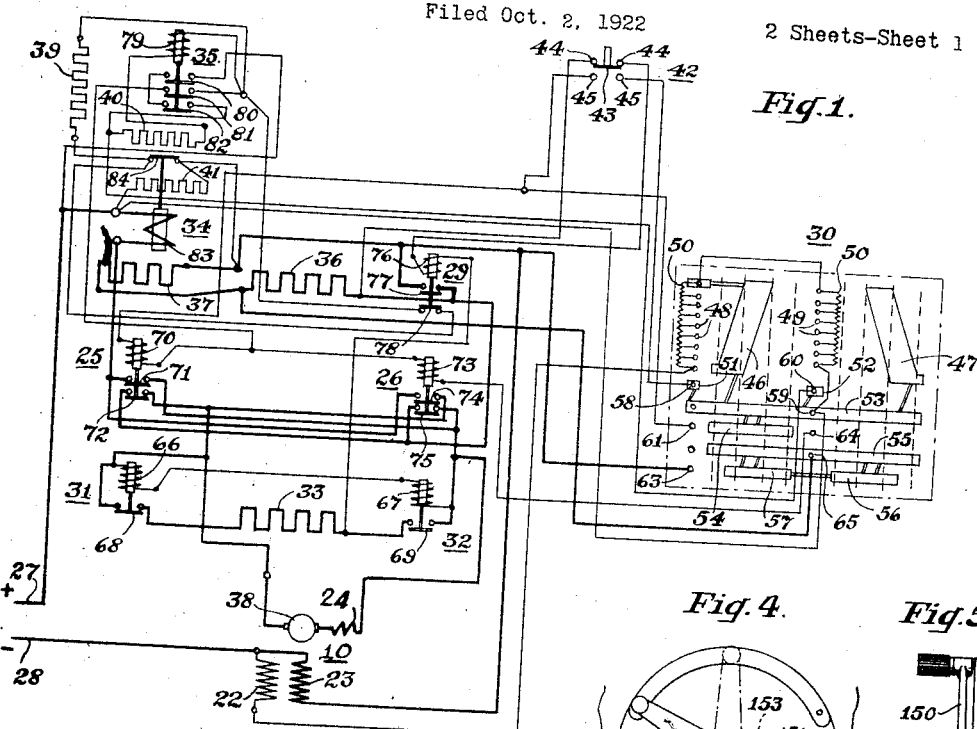
Fig.1.
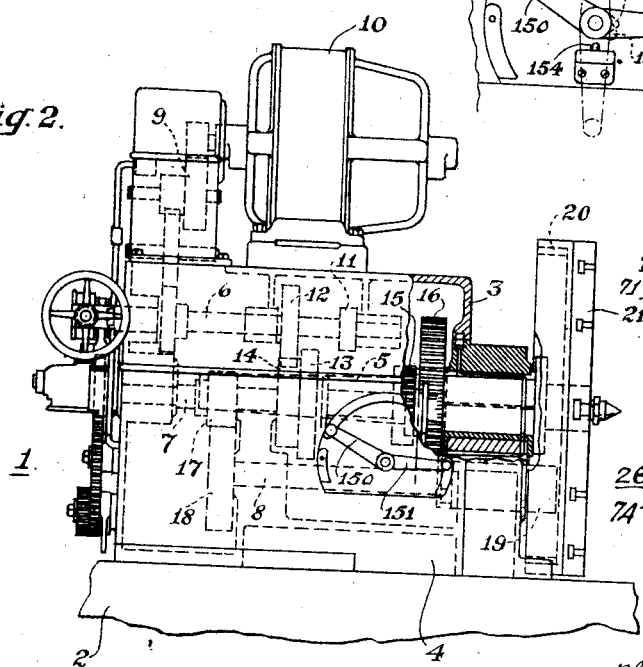
Fig.2.
Fig.4.
Fig.5.
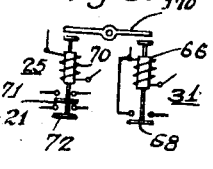
Fig.6.
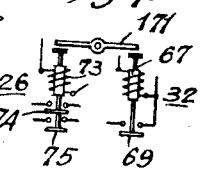
Fig.7.
INVENTOR.
H. L. Blood
BY Wayne B Wells
ATTORNEY.

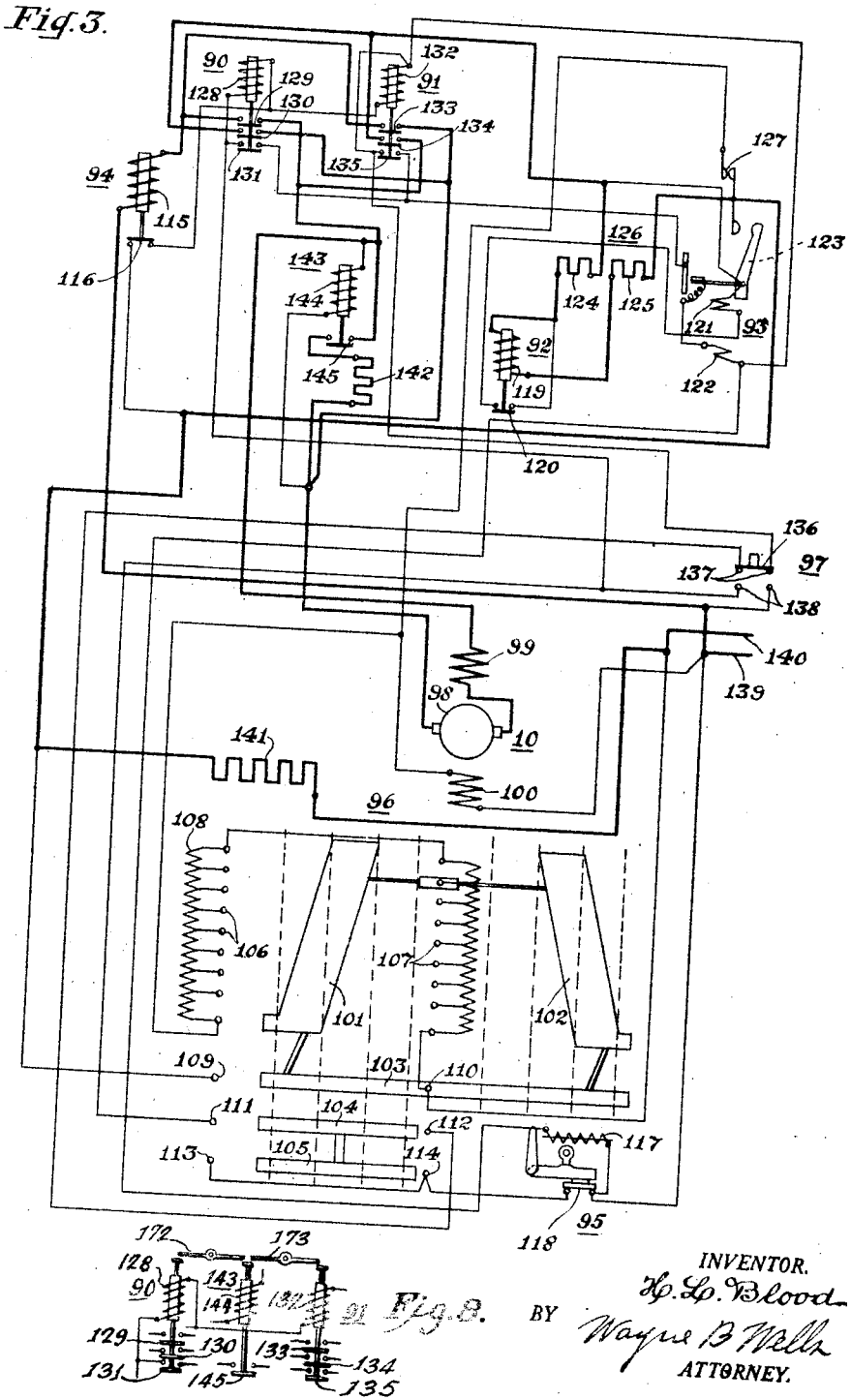

Patented June 8, 1926.

1,588,004

UNITED STATES PATENT OFFICE.

HAROLD L. BLOOD, OF NORTH PLAINFIELD, NEW JERSEY, ASSIGNOR TO NILES-BEMENT-POND COMPANY, OF NEW YORK, N. Y., A CORPORATION OF NEW JERSEY.

CONTROL SYSTEM.

Application filed October 2, 1922. Serial No. 591,949.

My invention relates to control systems for operating machine tools and particularly to control systems for operating lathes.

One object of my invention is to provide a control system that shall govern a main motor in a forward and in a reverse direction to operate the change gears in a machine tool and that shall be provided with means for operating the motor at slow speed and low torque when shifting of the change gears is being effected.

Another object of my invention is to provide a control system of the above indicated character that shall be provided with means for accelerating the main motor in a forward and in a reverse direction and that shall be provided with means comprising an auxiliary switch interlocked with said accelerating means for operating the motor at slow speed and low torque when shifting of the change gears is being effected.

Another object of my invention is to provide a control system for operating the motor connected to the change gears in the headstock of a lathe, that shall be provided with an auxiliary and an accelerating resistor adapted to be connected in circuit with the motor, means for controlling the said resistors to accelerate the motor in a forward and in a reverse direction, and an auxiliary switch for maintaining said resistors in circuit with the motor to operate it at slow speed and low torque when shifting said change gears.

A further object of my invention is to provide a control system for operating the motor connected to the change gears in the headstock of a lathe, that shall be provided with two main switches for operating the main motor in a forward and in a reverse direction and for completing a dynamic braking circuit therethrough, an auxiliary and an accelerating resistor adapted to be connected in circuit with the motor, an accelerating switch for controlling the accelerating resistor, a controller for governing the accelerating and main switches and the auxiliary resistor, and an auxiliary switch for maintaining said resistors in circuit with the motor to operate it at slow speed and low torque when shifting said change gears.

In operating lathes and particularly in operating lathes of very large size, trouble is sometimes experienced in shifting the change gears because of the clashing of teeth. Such trouble is not only common to a lathe but to any machine tool provided with change gears which are operated or shifted at intervals. It is not advisable to operate the main propelling motor under normal conditions, when shifting the change gears, inasmuch as the gears may be shifted to incorrect positions and trouble may be experienced before the motor stalls.

In a control system constructed in accordance with my invention, means is provided for operating the main propelling motor at very slow speed and at a very low torque in order to facilitate the shifting of the change gears. Inasmuch as the motor is operated at very slow speed, it is easy to mesh the various gears with each other. Moreover, inasmuch as the motor is operating at low torque, the motor will stall very easily if incorrect meshing of the various gear wheels is effected. Furthermore, interlocking means is provided in a control system constructed in accordance with my invention for insuring the motor against accelerating or operating at high torque during the shifting of the change gears.

Preferably, the control system is provided with two main switches for operating the main motor in a forward and in a reverse direction. An auxiliary and an accelerating resistor are provided for controlling the acceleration of the main motor and for limiting the motor speed and the motor torque when shifting of the change gears is being effected. An accelerating switch is provided for governing the operation of the accelerating resistor and a controller is provided for not only governing the excitation of the motor shunt-field winding but also for controlling the accelerating and the main switches. The control system is also provided with an auxiliary switch which serves to operate the main motor at slow speed and low torque when shifting of the change gears is being effected. When in the released position such auxiliary switch is included in the energizing circuit of the accelerating switch and when in an operative position the switch serves to complete an energizing circuit for one of the main switches if the controller is in the off position. Thus, when the auxiliary switch is operating, it is impossible to operate the accelerating switch. Moreover, it is impossible to operate the auxiliary switch unless the controller is in the off position. As heretofore set forth, the auxiliary switch operates one of the main switches to complete a circuit through the motor including the accelerating and the auxiliary resistors. Such resistors insure the operating of the main motor at slow speed and low torque.

In the accompanying drawings:

Figure 1 is a diagrammatic view of a control system embodying my invention.

Fig. 2 is a diagrammatic view of a motor connected to the change gears on the headstock of a lathe.

Fig. 3 is a modification of the control system shown in Fig. 1.

Figs. 4 and 5 are diagrammatic views illustrating the automatic operation of the auxiliary switch.

Figs. 6 and 7 are diagrammatic views illustrating the mechanical interlocking of the switches shown in Fig. 1.

Fig. 8 is a diagrammatic view illustrating mechanical interlocking of the switches shown in Fig. 3.

Referring to Fig. 2 of the drawings, a headstock 1 of a lathe is shown which is provided with change gears adapted to be operated by a control system constructed in accordance with my invention. The headstock 1 is mounted on a bed 2 in the usual manner and comprises a frame having upper and lower sections 3 and 4, respectively. A main spindle 5 is mounted in suitable bearings in the lower section 4 of the frame and is adapted to be connected by suitable change gears to a drive shaft 6 and two countershafts 7 and 8. The drive shaft and the countershafts are mounted parallel with the spindle and each of them is so mounted in bearings as to maintain the axis thereof in fixed position.

The drive shaft 6 is mounted in the upper section 3 of the frame and is connected by suitable gear wheels 9 to a motor 10. The motor 10 is controlled in a manner to be hereinafter set forth not only for operating the lathe spindle but also for facilitating the shifting of the change gears of the headstock. The drive shaft 6 has two gear wheels 11 and 12 fixedly mounted on it which are respectively adapted to mesh with gear wheels 13 and 14. The gear wheels 13 and 14 are slidably mounted on the countershaft 7. The countershaft 7 carries a gear wheel 15 which is adapted to be moved into mesh with a gear wheel 16. The gear wheel 16 is preferably fixedly mounted on the spindle 5 of the lathe. A gear wheel 17, which is mounted on the countershaft 7, is adapted to mesh with a gear wheel 18 on the countershaft 8. The countershaft 8 carries a gear wheel 19 which is adapted to mesh with a gear wheel 20 formed on the face plate 21 of the lathe.

From the above construction it is apparent the countershaft 7 may be directly connected to the spindle 5 by means of the gear wheels 15 and 16 and the speed of the rotation thereof may be varied by meshing either the gear wheels 12 and 14 or the gear wheels 11 and 13. Moreover, two other speeds of rotation for the lathe spindle may be effected by meshing the gear wheel 19 with the gear wheel 20 while meshing either the gear wheels 12 and 14 or the gear wheels 11 and 13. Suitable interlocking mechanism may be provided for preventing the simultaneous meshing of the gears 15 and 16 and the gear wheels 19 and 20. For a more complete description of the change gears referred to, reference may be had to the patent to Greenleaf et al. No. 1,422,098, dated July 11, 1922.

Referring to Fig. 1 of the drawings, a control system is illustrated for operating the motor 10 at various speeds in a forward and in a reverse direction and also for operating the motor at slow speed and low torque when shifting of the change gears is being effected. It is highly desirable to operate the motor during shifting of the change gears in order to prevent clashing between the teeth of the various gears. However, trouble is liable to be experienced if the motor is operated either at a relatively high speed or with a relatively high torque. If the motor is operated at high speed trouble is experienced in meshing the teeth and if the motor is operated at high torque and the gear wheels mesh incorrectly a number of gear wheels or teeth thereon are liable to be spoiled before the motor is stalled or stopped.

In the system shown in Fig. 1 of the drawings, the motor 10 is provided with a shunt field-magnet winding 22, a series field magnet winding 23 and an interpole winding 24. Two main switches 25 and 26 are provided for connecting the motor 10 across a supply circuit comprising conductors 27 and 28. An accelerating switch 29, which is controlled by a drum controller 30, is provided for governing the acceleration of the motor in a forward and in a reverse direction. Two auxiliary switches 31 and 32 are provided for connecting the motor 10 through a braking resistor 33 upon release of the two main switches 25 and 26. The switches 25 and 31 are mechanically interlocked as shown in Fig. 6 of the drawings, to prevent the simultaneous operation of the switches. The switches 26 and 32 are mechanically interlocked, as shown in Fig. 7 of the drawings, to prevent the simultaneous operation of the two switches. An overload switch 34 and a low voltage switch 35 are provided for protecting the system in case of overload or low voltage circuit conditions.

An accelerating resistor 36, which is controlled by the accelerating switch 29, and an auxiliary resistor 37 are provided in circuit with the armature 38 of the motor. Two resistors 39 and 40 are associated with the low voltage switch 35 and a resistor 41 is provided for taking care of inductive discharges from the shunt field-magnet winding. An auxiliary switch 42 comprising a switch member 43 and two sets of contact members 44 and 45 is provided for operating the motor 10 at slow speed and low torque when shifting of the change gears is being effected.

The drum controller 30 comprises contact segments 46 and 47 which are respectively adapted to engage contact fingers 48 and 49. The contact fingers 48 and 49 are connected to the shunt field resistor 50. The drum controller is also provided with contact segments 51 to 57 inclusive, which are adapted to engage contact fingers 58, 59, 60, 61, 63, 64 and 65.

The dynamic braking switches 31 and 32 respectively comprise energizing coils 66 and 67, and switch members 68 and 69. The main switch 25 comprises an energizing coil 70 and two switch members 71 and 72. The main switch 26 comprises an energizing coil 73 and two switch members 74 and 75. The switch 25 is connected to the switch 31 by means of the mechanical interlock 170 and the switch 26 is connected to the switch 32 by means of the mechanical interlock 171. The accelerating switch 29 comprises an energizing coil 76 and two switch members 77 and 78. The low voltage switch 35 comprises an energizing coil 79 and three switch members 80, 81 and 82. The overload switch 34 comprises an energizing coil 83 and a switch member 84.

When the controller 30 is in the off position, as shown in Fig. 1 of the drawings, a circuit is completed from the supply conductors 27 and 28 for operating the low voltage switch 35. The circuit through the coil of the low voltage switch extends from the positive supply conductor 27 through the contact fingers 59 and 60, which are bridged by the contact segments 53 and 52 of the controller 30, resistor 40, energizing coil 79 of the switch 35, switch member 78 of the accelerating switch 29, switch member 84 of the overload switch 34, and the series field-magnet winding 23 to the negative supply conductor 28. Upon operation of the low voltage switch 35, a holding circuit therefor extends from the positive supply conductor 27 through the switch member 80, switch member 82, resistor 40, coil 79, switch member 78, switch member 84, and the series field-magnet winding 23 to the negative supply conductor 28.

In case it is desired to operate the motor 10 in a forward direction to rotate the spindle of the lathe, the controller 30 is moved towards the left, as shown in Fig. 1 of the drawings. Upon engagement between the contact finger 61 and the segment 54, a circuit is completed for operating the main switch 25. The circuit through the coil of the main switch 25 extends from the positive supply conductor 27, through the contact fingers 59 and 61, which are bridged by the contact segments 53 and 54, coil 70 of the switch 25, switch members 81 and 78, switch member 84, and the series field-magnet winding 23 to the negative supply conductor 28. The switch 25 is operated and a circuit is completed through the motor 10 for operating it in a forward direction. The circuit through the motor 10 extends from the positive supply conductor 27 through coil 83, switch member 71, winding 24, armature 38, switch member 72, resistors 36 and 37 and the series field-magnet winding 23 to the negative supply conductor 28. The shunt field-magnet winding 22 is energized by a circuit which extends from the positive supply conductor 27 through the controller 30 and the field-magnet winding 22 to the negative supply conductor 28. Upon further movement of the controller 30, the segment 57 engages the contact finger 63 to short circuit the resistor 37. Moreover, the coil 76 of the accelerating switch 29 is energized by the counter electro-motive force of the motor 10 to short circuit the resistor 36. The switch member 77 completes a circuit around the resistor 36. Upon operation of the switch 29, a holding circuit for the coil 70 is established through the resistor 39. The motor 10 is not only accelerated by excluding the resistors 36 and 37 from the armature circuit but is also accelerated by varying the amount of the resistor 50 included in the circuit of the shunt field-magnet winding 22. The circuit for operating the accelerating switch 29 extends from one terminal of the armature 38 through the switch member 72, contact members 44, which are bridged by the switch member 43, coil 76 of the switch 29, switch member 69, and the coil 24 to the other terminal of the armature 38. The coils 66 and 67 of the switches 31 and 32 are connected across the armature 38 and are energized upon current flow through the motor 10. The switch 31 does not operate because of the mechanical interlock 170 which is operated by the switch 25. However, the switch 32 is operated to complete the circuit through the coil 76 for operating the accelerating switch 29.

Upon movement of the controller 30 to the off position, the energizing circuit for the coil of the main switch is broken by separating the contact finger 61 and the contact segment 54. The main switch 25 is released and a dynamic-braking circuit is completed through the motor 10. The dynamic-braking circuit for the motor 10 extends from one terminal of the armature 38 through the winding 24, switch member 69, resistor 33, and the switch member 68 to the other terminal of the armature of the motor 10. The coils 66 and 67 of the braking switches 31 and 32 are energized when a dynamic-braking current is flowing through the motor.

If it is desired to operate the motor 10 in a reverse direction, the controller 30 is moved towards the right, as shown in Fig. 1 of the drawings. Upon engagement between the contact finger 64 and the contact segment 54, a circuit is completed for energizing the coil 73 of the main magnet 26. Such circuit extends from the positive supply conductor 27 through the contact fingers 59 and 64, which are bridged by the contact segments 53 and 54, coil 73, switch members 81, 78 and 84, and the series field-magnet winding 23 to the negative supply conductor 28. The main switch 26 is operated and a circuit is completed through the motor 10. The circuit through the motor 10 extends from the positive supply conductor 27, through the coil 83 of the overload switch 34, switch member 74, armature 38, field-magnet winding 24, switch member 75, resistors 36 and 37, and the field-magnet winding 23 to the negative supply conductor 28. In the manner heretofore described the auxiliary resistor 37 is excluded from the motor circuit by the controller 30 and the accelerating resistor 36 is excluded from the motor circuit by the accelerating switch 29. The circuit for operating the accelerating switch 29 extends from one terminal of the armature 38 through the switch member 68, resistor 33, coil 76, contact members 44, which are bridged by the switch segment 54, switch member 75, and the coil 24 to the other terminal of the armature 38. The coil 67 of the switch 32 is energized but the mechanical interlock 171 prevents the operation of the switch. The motor is further accelerated by the contact segments 46 and 47, which cooperate with the contact fingers 48 and 49 to insert the resistor 50 in circuit with the shunt field-magnet winding 22. Upon return of the controller to the off position, a dynamic-braking circuit is completed through the motor in the manner heretofore set forth.

The auxiliary switch 42 has a switch member 43 which normally bridges the contact members 44. The contact members 44 are included in the energizing circuit of the accelerating switch 29. When the controller 30 is in the off position and the switch member 43 is moved to bridge the contact members 45, a circuit is completed for operating the main switch 25. Moreover, it will be noted, when the auxiliary switch is moved to operate the main switch 25, it is impossible to operate the accelerating switch 29 and accelerate the motor. The circuit, which is completed by the auxiliary switch for operating the main switch, extends from the positive supply conductor 27 through the contact fingers 59 and 58, which are bridged by the contact segments 53 and 51, contact fingers 45, which are bridged by the switch member 43, coil 70, switch members 81, 78 and 84, and the field-magnet winding 23 to the supply conductor 28. Upon operation of the main switch 25, the motor 10 is energized. The resistors 36 and 37 are necessarily included in circuit with the motor armature inasmuch as the controller 30 is in an off position and the accelerating switch 29 is released. Accordingly the motor is operated at very slow speed and very low torque.

In Fig. 3 of the drawings, a modified control system is shown for governing the operation of the motor 10. The system comprises two main switches 90 and 91, two accelerating switches 92 and 93, an over-load switch 94, a low voltage switch 95, a controller 96, and an auxiliary switch 97. The motor 10 comprises an armature 98, a series field-magnet winding 99 and a shunt field-magnet winding 100. The controller 96 comprises movable contact segments 101, 102, 103, 104 and 105. The contact segments 101 and 102 are adapted to engage contact fingers 106 and 107 for controlling the resistor 108 which is included in circuit with the shunt field-magnet winding 100. Contact segment 103 is adapted to engage contact fingers 109 and 110, the contact segment 104 is adapted to engage contact fingers 111 and 112, and the contact segment 105 is adapted to engage contact fingers 113 and 114.

The overload switch 94 comprises an energizing coil 115 and a switch member 116. The low voltage switch 95 comprises an energizing coil 117 and a switch member 118. The accelerating switch 92 comprises a coil 119 and a switch member 120. The accelerating switch 93 comprises coils 121 and 122 and a switch member 123. The switches 92 and 93 serve to control the operation of portions 124 and 125 of an accelerating resistor 126. The accelerating switch 93 also controls a pair of contact fingers 127 for short circuiting the shunt field-magnet winding resistor 108 under certain conditions.

The main switch 90 comprises an energizing coil 128 and two switch members 129 and 130. The main switch 90 also controls an auxiliary switch 131. The main switch 91 comprises an energizing coil 132 and two switch members 133 and 134. The main switch 91 also controls an auxiliary switch 135. The auxiliary switch 97 comprises a switch member 136 which is adapted to bridge either the contact members 137 or the contact members 138. The auxiliary switch 97 serves to connect the motor across the supply conductors 139 and 140 when it is desired to operate the motor in a forward direction at slow speed and low torque.

An auxiliary resistor 141 is provided for reducing the motor speed and torque when the auxiliary switch 97 is operated. A braking resistor 142 is provided which is controlled by a braking switch 143. The switch 143 comprises an energizing coil 144 and a switch member 145. The braking switch 143 is connected to the two switches 90 and 91 by means of the two mechanical interlocks 172 and 173. The interlock 172 prevents the simultaneous operation of the switches 90 and 143 and the interlock 173 prevents the simultaneous operation of the switches 91 and 143.

When the controller 96 is in the off position, the shunt field-magnet winding 100 is energized by a circuit which extends from the supply conductor 139 through the winding 100, switch members 127, and the resistor 141 to the supply conductor 140. The contact members 127 short circuit the resistor 108 and thus permit the energizing of the shunt field-magnet winding with practically full line voltage. If it is desired to operate the motor 10 in a forward direction, the controller 96 is moved towards the left, as shown in Fig. 3 of the drawings. Upon engagement between the contact segments 104 and 105 and the contact fingers 111 and 113, a circuit is completed for operating the main switch 90. The circuit through the energizing coil 128 of the main switch 90 extends from the supply conductor 139 through the switch member 118, contact fingers 111 and 113, which are bridged by the contact segments 104 and 105, coil 128, switch member 116 and the resistor 141 to the supply conductor 140. Thereupon, the switch 90 is operated and a circuit is completed through the motor 10. The circuit through the motor 10 extends from the supply conductor 139 through coil 115 of the overload switch, switch member 129, series field-magnet winding 99, armature 98, switch member 130, resistor 124, coil 119, resistor 125, and the auxiliary resistor 141 to the supply conductor 140.

When the controller 96 is moved to effect engagement between the contact segments 104 and 105 and the contact fingers 111 and 113, it will be noted the contact segment 103 engages the contact finger 109. Upon engagement between the contact segment 103 and the contact finger 109, the resistor 141 is short circuited. The resistor 141 is included in the circuit of the motor 10 when the motor is operated by the auxiliary switch 97, as will be pointed out hereinafter. The auxiliary resistor is of such size as to prevent the operation of the series accelerating switches 92 and 93 when included in series with the motor. When the motor 10 is operated in series with the accelerating resistor 126 and the auxiliary resistor 141, it is operated at low speed and very low torque.

In order to accelerate the motor, the switch 92 is operated to short circuit the resistor 124. Thereupon, the accelerating switch 93 is operated to short circuit the resistor 125. Upon operation of the accelerating switch 93, the contact members 127 are separated to insert a portion of the resistor 108 in circuit with the shunt field-magnet winding 100. The amount of resistance inserted in the field-magnet winding circuit depends upon the position of the controller. Further movement of the controller 96 towards the left increases the amount of resistance included in the circuit of the shunt field-magnet winding to increase the speed of the motor.

Upon movement of the controller to the off position, the dynamic-braking switch 143 is operated to insert the braking resistor 142 in circuit with the motor. The mechanical interlocks 172 and 173 prevent operation of the dynamic-braking switch when either of the main switches are in operative position.

If it is desired to operate the motor in a reverse direction, the controller 96 is moved toward the right, as shown in Fig. 3 of the drawings. Upon engagement between the contact segments 104 and 105 and contact fingers 112 and 114, a circuit is completed for operating the main switch 91. The circuit through the coil of the main switch 91 extends from the supply conductor 139 through the switch member 118, contact members 114 and 112, which are bridged by the contact segments 104 and 105, switch member 136, coil 132, switch member 116, and the resistor 141 to the supply conductor 140. Thereupon, the main switch 91 is operated for completing a circuit through the motor 10. The circuit through the motor 10 extends from the supply conductor 139 through coil 115 of the over-load switch, switch member 133, armature 98, series field-magnet winding 99, switch member 134, resistor 124, coil 119, resistor 125, and the resistor 141 to the supply conductor 140. Thereupon, the accelerating switches 92 and 93 are successively operated to short circuit the resistors 124 and 125. The contact members 127 are separated by the accelerating switch 93 to permit the insertion of the resistor 108 in circuit with the shunt field winding. Upon movement of the controller 96 to the off position, a dynamic-braking circuit is completed through the motor as above set forth. When operating the system as above set forth, the segment 103 and the contact finger 109 short circuit the resistor 141 prior to the operation of switches 92 and 93.

When the controller 96 is in the off position, the auxiliary switch 97 may be operated for effecting operation of the motor 10 at slow speed and low torque. The motor is so operated as to facilitate the shifting of the change gears shown in Fig. 2. Normally the switch member of the auxiliary switch 97 bridges the contact members 137 which are included in the energizing circuit of the main switch 91. Thus, upon operation of the auxiliary switch, it is impossible to effect operation of the motor in a reverse direction. When the auxiliary switch is moved to on operative position, the switch member 136 bridges the contact member 138. Thereupon a circuit is completed through the coil of the main switch 90. The circuit through the energizing coil extends from the supply conductor 139 through the contact members 138, which are bridged by the switch member 136, coil 128, switch member 116 and the resistor 141 to the supply conductor 140. Thereupon the main switch 90 is operated and a circuit is completed through the motor 10. Such circuit through the motor includes not only the accelerating resistors 124 and 125 but also the auxiliary resistor 141. Consequently the motor is operated at very slow speed and very low torque. As has been set forth above, the resistor 141 is of such size as to prevent the operation of the accelerating switches 92 and 93 when it is in circuit with the motor 10. Accordingly, when the motor is operated by the auxiliary switch 97, it is impossible to effect acceleration of the motor.

Referring to Figs. 2 and 4 of the drawings, means is disclosed whereby the jogging push button or auxiliary switch shown in the systems of Figs. 1 and 3 may be automatically operated. The levers 150 and 151 serve to effect shifting of the gears in the headstock in the manner set forth in the above mentioned patent to Greenleaf, et al. Such levers may be provided with lugs or projections 152 and 153 on the ends thereof for operating a suitable push button 154. The push button 154 may be considered the switch 43 in the system disclosed in Fig. 1 or the switch 97 disclosed in the system shown in Fig. 3. Thus, it is apparent upon operation of either of the levers 150 or 151 for shifting the gears in the headstock the projection 152 or 153 engages the push button to rotate the main motor at slow speed and very low torque as heretofore described. The projections 152 and 153 on the levers 150 or 151 may be so located as to operate the push button switch just prior to the meshing of the gears being shifted.

Modifications in the system, and in the arrangement and location of parts may be made within the spirit and scope of my invention and such modifications are intended to be covered by the appended claims.

What I claim is:

1. In a control system for a machine tool, the combination with a set of change gears for operating the machine at different speeds, a motor connected to the change gears, and means for accelerating the motor in a forward and in a reverse direction, of an auxiliary switch interlocked with said accelerating means and serving when in an operative position to prevent acceleration of the motor, and to operate the motor at slow speed and low torque, and means for insuring operation of the auxiliary switch during the shifting of the change gears.

2. In a control system for a machine tool, the combination with a set of change gears for operating the machine at different speeds, a motor connected to the change gears, and means comprising an accelerating switch and a controller for accelerating the motor, of an auxiliary switch interlocked with said accelerating means for preventing acceleration of the motor and for operating it at slow speed and low torque, and means for insuring the operation of the auxiliary switch during the shifting of the change gears.

3. In a control system for a machine tool, the combination with a set of change gears for operating the machine at different speeds, a motor connected to the gears, two main switches for operating the motor in a forward and in a reverse direction, and an accelerating switch and a controller for governing the acceleration of the motor, of an auxiliary switch so interlocked with said controller as to be operative only when the controller is in off position, said auxiliary switch being so connected with said main switches as to operate the motor at slow speed and low torque during the shifting of said change gears.

4. In a control system for a machine tool, the combination with a set of change gears for operating the machine at different speeds, a motor connected to said change gears, an auxiliary and an accelerating resistor adapted to be connected in circuit with said motor, and means for controlling said resistors and for accelerating the motor in a forward and in a reverse direction, of an auxiliary switch for operating the motor at slow speed and low torque with said resistors in circuit therewith, and means for insuring the operation of the auxiliary switch during the shifting of the said change gears, said auxiliary switch, when in an operative position, being so interlocked with said controlling means as to prevent acceleration of the motor.

5. In a control system for a machine tool, the combination with a set of change gears for operating the machine at different speeds, a motor connected to said change gears, an auxiliary and an accelerating resistor adapted to be connected in circuit with said motor, an accelerating switch for controlling said accelerating resistor, and a controller for governing the operation of said accelerating switch and the auxiliary resistor, of an auxiliary switch for operating the motor at slow speed and low torque with said resistors in circuit therewith during the shifting of the change gears, said auxiliary switch being operative only when the controller is in the off position.

6. In a control system for a lathe having a headstock provided with change gears, the combination with a motor connected to the change gears, and controlling means for accelerating said motor, of an auxiliary switch for operating the motor at slow speed and low torque, means for insuring the operation of said auxiliary switch during the shifting of said change gears, and means for interlocking said auxiliary switch with the controlling means to prevent operation of the motor by the auxiliary switch when the controller is in an operative position.

7. In a control system for a lathe, the combination with a set of change gears and a driving motor connected to said change gears, of means comprising a controller for operating said motor in a forward and in a reverse direction and for governing the field excitation of the motor, an auxiliary switch for operating the motor slowly in a forward direction and means for insuring the operation of the auxiliary switch during the shifting of the change gears, said auxiliary switch being interlocked with said controller to prevent operation of the motor by the auxiliary switch except when the controller is in an off position.

8. In a control system for a lathe, the combination with a set of change gears for operating the lathe at different speeds, a motor connected to the change gears, and means for controlling the acceleration of the motor in a forward and in a reverse direction, of an auxiliary switch for operating the motor slowly and at low torque during the shifting of said change gears, and means for preventing operation of said controlling means to accelerate the motor except when the auxiliary switch is in released position and for preventing operation of the motor by the auxiliary switch except when said control means is in a predetermined position.

9. In a control system for a lathe, the combination with a set of change gears for varying the speed of the lathe, a motor connected to the change gears, two main switches for operating the motor in a forward and in a reverse direction, a switch for controlling the acceleration of the motor, and a drum controller for governing the operation of said accelerating and main switches, of an auxiliary switch having an operative and a released position, said auxiliary switch, when in a released position, being in circuit with the energizing coil of said accelerating switch and when in an operative position being in the energizing circuit of one of said main switches, the auxiliary switch serving to operate the motor at slow speed and low torque, and means for insuring the operation of the auxiliary switch during the shifting of the change gears.

10. In a control system for a lathe, the combination with a set of change gears for operating the lathe at different speeds, a motor connected to the change gears, two main switches for operating the motor in a forward and in a reverse direction, an accelerating and an auxiliary resistor adapted to be connected in circuit with said motor, an accelerating switch for controlling the operation of said accelerating resistor, and a controller for governing the excitation of the motor shunt field winding and for controlling said accelerating and main switches, of an auxiliary switch having an operative and a released position, said auxiliary switch being in the energizing circuit of said accelerating switch when in a released position and being in circuit with said controller when in an operative position, the auxiliary switch serving to operate the motor at slow speed and low torque during the shifting of the change gears.

11. In a control system for a lathe, the combination with a set of change gears for operating the lathe at different speeds, a motor connected to the change gears, switches for controlling the acceleration of the motor in a forward and in a reverse direction, an accelerating and an auxiliary resistor adapted to be connected in circuit with the motor, and a controller for governing the operation of said switches and the short circuiting of said resistors, of an auxiliary switch for operating the motor in circuit with the auxiliary and the accelerating resistor at slow speed and low torque, said auxiliary switch being interlocked with said controller to prevent operation of the motor by the auxiliary switch except when the controller is in an off position.

12. In a control system for a machine tool having a set of change gears, the combination comprising a motor for operating the gear wheels, means for operating the motor in the forward and in the reverse direction, means for shifting the change gears, and means automatically operated by said shifting means for maintaining a closed circuit through the motor to insure the operation of the motor at slow speed and low torque during each shifting operation.

13. In a control system for a machine tool having a set of change gears, the combination comprising a motor connected to the change gears for operating the machine, an auxiliary switch for operating the motor at slow speed and low torque, levers for effecting shifting of the change gears, and lugs projecting from said levers for operating the auxiliary switch upon operation of the levers.

In testimony whereof, I hereto affix my signature.

HAROLD L. BLOOD.